United States Patent [19]
Jungles et al.

[11] 4,077,048
[45] Feb. 28, 1978

[54] OPTICAL DIFFRACTOMETERS

[75] Inventors: John Jungles, Thurmaston; David John Whitehouse, Melton Mowbray; Eric Gordon Nightingale, Leicester, all of England

[73] Assignee: The Rank Organisation Limited, London, England

[21] Appl. No.: 571,273

[22] Filed: Apr. 24, 1975

Related U.S. Application Data

[63] Continuation-in-part of Ser. No. 454,009, Mar. 22, 1969, Pat. No. 3,927,253.

[30] Foreign Application Priority Data

Mar. 22, 1973 United Kingdom ............... 13831/73

[51] Int. Cl.² ............................................. H04M 5/72
[52] U.S. Cl. ................... 358/89; 350/162 R; 350/3.82; 340/15.5 R
[58] Field of Search ............................ 178/6.5, 6.8, 6; 358/88, 89, 176; 350/162 R, 3.5; 340/15.5 R, 15.5 SS

[56] References Cited

U.S. PATENT DOCUMENTS

| | | | |
|---|---|---|---|
| 3,409,872 | 11/1968 | Hogg | 350/162 SF |
| 3,614,521 | 10/1971 | Brueschke | 178/6 |

*Primary Examiner*—Robert L. Griffin
*Assistant Examiner*—Edward L. Coles
*Attorney, Agent, or Firm*—Brisebois & Kruger

[57] ABSTRACT

An optical diffractometer is disclosed in which there is provided a television camera system for displaying light patterns derived from the image plane or the transform plane of the diffractometer. The camera system includes a modulating network for providing a pseudo three dimensional display by mixing signals from the X ramp and Y ramp generators together and by mixing the signal from the Y ramp generator with a signal representative of the television camera beam current. The mixed signals are applied to the X and Y plates of a cathode ray tube to provide a display of the signals.

13 Claims, 2 Drawing Figures

OPTICAL DIFFRACTOMETERS

This application is a continuation in part of Ser. No. 454,009, filed Mar. 22, 1969, now U.S. Pat. No. 3,927,253.

BACKGROUND OF THE INVENTION

The present invention relates to optical diffractometers, and particularly to improvements thereto by including a television camera and cathode ray tube arrangement for displaying images derived from the diffractometer.

Known optical diffractometers essentially comprise three units, a light source, which is normally a laser which produces a coherent light beam, for example a helium-neon laser producing light at 6328 Angstrom units, a transformation unit, in which is located the transparency or other object, and a reconstruction unit which reconstructs the required image of the object. The light source used in such diffractometer systems is normally operated in the $TEM_{00}$ mode, and the light emitted from the laser is condensed onto a pin hole by a condenser lens. This arrangement acts to inhibit stray light and to cut out unwanted modes of the laser. The pinhole aperture, or stop, is located in the front focal plane of a lens which acts as a beam expander and collimator, and the object, such as a transparency, is located in a position such that the collimated light falls on the selected area thereof. The light falling on the object is diffracted thereby and the diffracted light is collected by a transform lens and focused at a plane known as the transform plane. The optical information which can be obtained from this plane is important because it represents the Fourier spectrum of the spatial variations of optical transmission across the object. Certain parts of the spectrum can be modified by selectively transmitting part of the light in the transform plane. In this way, periodic or random features present in the object can be illuminated or enhanced as required.

Light passing through the transform plane is focused by an image lens at an image plane at which the image is reconstructed.

OBJECTS OF THE INVENTION

It is a primary object of the present invention to provide an optical diffractometer having a display system which is capable of providing a display is pseudo three dimensional form.

It is a further object of the invention to provide an optical diffractometer in which the image display is provided in a manner in which it can be observed in daylight or artificial light without requiring darkening of a room.

It is yet another object of the invention to provide an optical diffractometer having means for displaying images as discussed above in which the image at either the transform plane or the image plane can be displayed readily.

Another object of the invention is to provide an optical diffractometer which is readily connectable to a digital computer for further processing of signals derived therefrom.

SUMMARY OF THE INVENTION

The invention resides in an optical diffractometer of the type comprising a light source, an image transformation unit, and an image reconstruction unit, wherein there is a television camera positioned to receive light from said image reconstruction unit, means for modulating the line scan of said television camera by a Y signal representative of the television camera beam current, means for modulating the line scan of said television camera to effect an X shift in dependence on the line position, and means for displaying the signal from the camera whereby a pseudo three dimensional display of an image from said image reconstruction unit can be obtained.

Preferably said means for displaying said signal from said camera include a cathode ray tube having X and Y deflection producing means and said television camera includes sync pulse generator means, and Y ramp generator means connected to said sync pulse generator means and deriving its signal rate from the sync pulse rate of said sync pulse generator means, and said means for modulating said line scan of said television camera by a Y signal representative of the television camera beam current includes a first mixer connected to said Y ramp generator means and to means producing a signal representative of said television tube beam current, the output of said first mixer being connected to said Y deflection producing means of said cathode ray tube.

Said first mixer may be adjustable whereby to adjust the amplitude of said modulation of said line scan by said Y signal representative of said television camera beam current.

Said means for displaying said signals from said camera may include a cathode ray tube having X and Y deflection producing means and in this case said television camera includes sync pulse generator means, X ramp generator means connected to said sync pulse generator means and deriving its signal rate from the sync pulse rate, and Y ramp generator means connected to said sync pulse generator means and deriving its signal rate from the sync pulse rate, and said means for modulating said line scan of said television camera to effect an X shift in dependence on the line position comprises a second mixer the input of which is connected to said X ramp generator means and said Y ramp generator means and the output of which is connected to said x deflection producing means of said cathode ray tube. Preferably said second mixer is adjustable whereby to adjust the degree of X shift of each line scan in dependence on its position.

In a preferred optical diffractometer the image reconstruction unit includes means for focusing an image transform at a transform plane and a reconstructed image at an image plane and there are further provided means for selectively focusing the television camera at either the transform plane or the image plane whereby the image transform or the reconstructed image may be selectively displayed by said display means.

The features and advantages of the present invention will become more apparent during the course of the following description which is provided by way of non-restrictive example only.

DESCRIPTION OF THE PREFERRED EMBODIMENT

Figure 1:
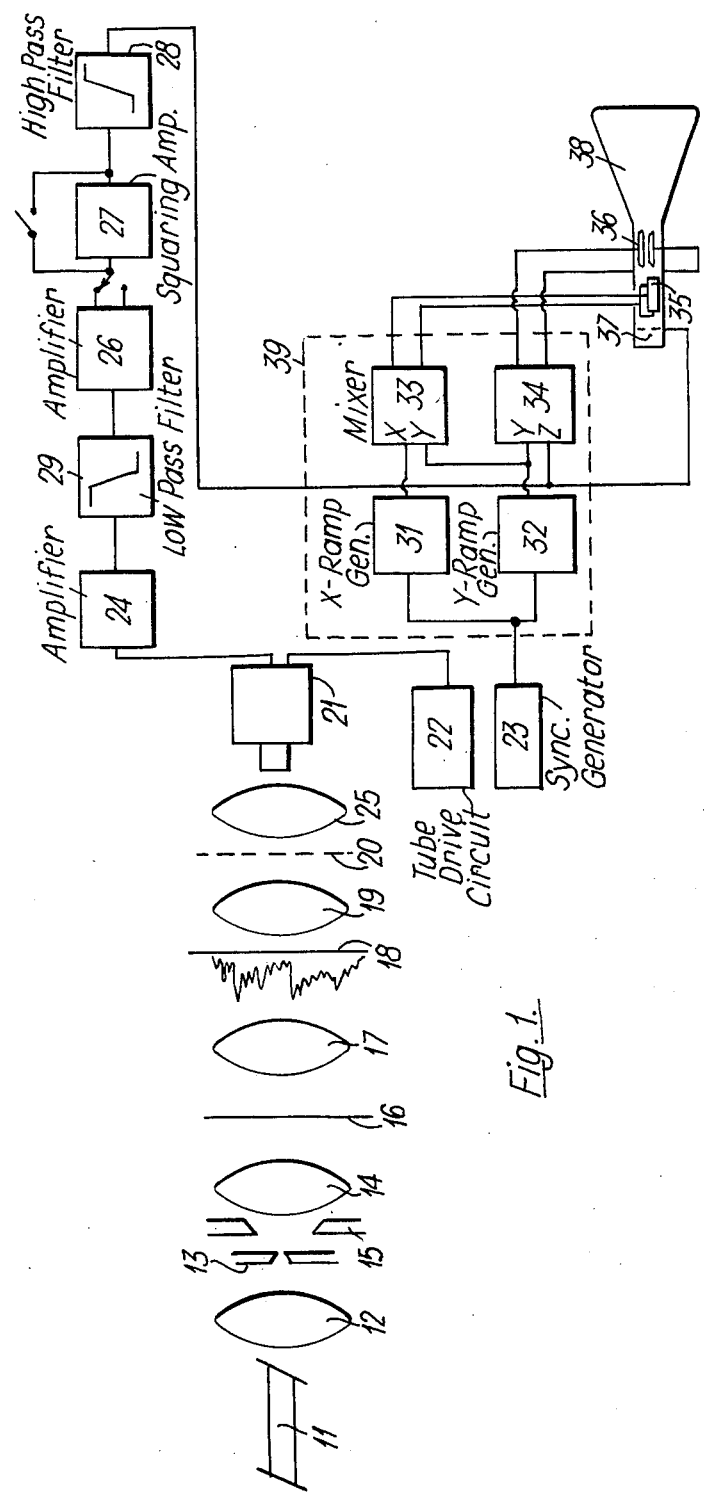
FIG. 1 is a schematic diagram illustrating an embodiment of the invention.

Referring now to the drawings there is shown, in FIG. 1, an optical diffractometer comprising a laser source of light 11 which is a multimode laser producing light in both the TEM$_{00}$ mode and also other modes. The laser light is passed to a condenser lens 12 which focuses the light at an adjustable pinhole aperture 13 which is located in the rear focal plane of the lens 12. The light is then passed through a collimator lens 14 which has a variable aperture stop 15 at the entrance pupil thereof. The collimator lens 14 also acts as a beam expander to produce a broad collimated beam which is directed into an object 16, such as a grating, a transparency or other sample, which diffracts the light in a known way.

The diffracted light from the object 16 is collected by a transform lens 17 and focused at a transform plane 18. The information obtained at the transform plane is of importance since this represents the Fourier spectrum of the spatial variations of transmission across the object. Since the object will frequently be larger than the diameter of the light beams from the collimator lens 14 the position of the object 16 at the object plane between the lenses 14 and 17 will have to be laterally adjusted to the individual areas of interest and the information withdrawn from viewing the transform plane recorded for a comparison to be made.

From the transform plane light passes to an imaging lens 19 which focuses the light at an image plane 20 to form a reconstructed image of the object. A television camera 21 is located to view the light from the diffractometer and can be focused either at the image plane 20 or the transform plane 18 by interposition or removal of a lens 25 between the imaging lens 19 and the image plane 20. The television camera 21 is controlled by a tube drive circuit 22 and synchronised by a sync generator 23.

The television camera 21 produces a signal representative of the bean current therein which is fed to a wide bandwidth amplifier 24 sensitive to beam current fluctuations, and then via an adjustable low-pass filtr 29 to a switched video amplifier 26 which has mirrored selectable outputs, that is positive-going or negative-going outputs, and a squaring amplifier 27. This latter is connected in parallel with a switch 39 which can be closed to short circuit the amplifier 27 is desired. When the switch 39 is open the amplifier 27 operates to modify the video signal according to an adjustment of a level control which serves to sample the video waveform at some voltage. The result of this detection is a square wave signal which represents black at one level and white at the other. The signal is then passed to an adjustable high pass filter 28 which can be used separately or in conjunction with the low pass filter 29, effectively to band pass a selected portion of the video signal. The output from the filter 28 is a video signal suitable for feeding to the grid 37 of a cathode ray tube 38 which serves as the display means for the diffractometer.

The cathode ray tube 38 is provided with X deflection plates 35 and Y deflection plates 36 which are fed with scanning signals synchronised by the signal from the sync pulse generator 23 via the control circuit generally indicated 39.

The control circuit 39 comprises an X ramp generator 31 the input of which is fed with the sync pulses from the sync pulse generator 23, and a Y ramp generator 32 which is similarly connected to the output of the sync pulse generator 23. A mixer 33 is fed with the output from the X ramp generator 31 and the Y ramp generator 32 and the output from the mixer 33 is fed to the X plates 35 of the cathode ray tube 38. The output from the Y ramp generator is also fed to a mixer 34 which is connected to receieve the same video signal from the high-pass filter 28 as is fed to the control grid 37 of the cathode ray tube 38. The output from the mixer 34 is fed to the Y plates 36 of the cathode ray tube 38.

Figure 2:
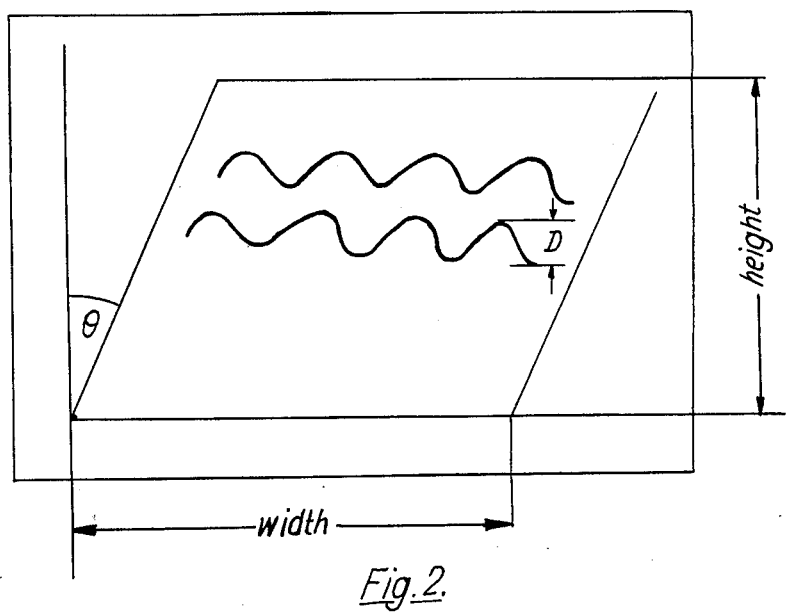
FIG. 2 is a diagram illustrating the display produced by the display means of the embodiment of FIG. 1.

The X ramp signal provided by the generator 31 is in the form of a regular constant amplitude sawtooth waveform and the Y ramp signal is in the form of a continuously decreasing staircase waveform for each frame, the steps of the staircase being synchronised with the teeth of the sawtooth waveform from the X ramp generator 31 by the sync pulses which are fed to both the X ramp generator 31 and the Y ramp generator 32 from the sync pulse generator 23. Mixing the X ramp signal and the Y ramp signal thus produces a sawtooth waveform which is regularly decreasing and the effect of this when applied to the X deflection plates 35 is to cause the raster scan on the screen of the cathode ray tube 38 to be displaced laterally from the commencement to the termination of the frame. This is illustrated schematically in FIG. 2 where it is seen that the upper lines of the scan are displaced to the right with respect to the lower lines of the scan thereby creating a trapezoidal display raster. The degree of mixing effected by the mixer 33 controls the degree of X shift applied to each successive line scan and therefore controls the angle $\theta$ indicated in FIG. 2. as the inclination of the trapezoidal display on the screen of the cathode ray tube 38. Clearly, if the mixer 33 operates to modify the X ramp waveform minimally by the Y ramp waveform the raster would approximate to a rectangular form as in a normal television tube, whereas with maximum mixing of the X and Y ramp waveforms the maximum degree of X shift is applied to the successive line scans and therefore the angle $\theta$ is increased to a maximum. In order to provide a degree of control over the displacement of successive lines of the line scan the mixer 33 is made adjustable.

The mixer 34 operates to modulate the staircase waveform of the Y ramp by the video information signal which is fed to the grid 37 of the cathode ray tube 38. This has the effect of causing a Y displacement of the line scan which is synchronised with the brightness modulations of the video information signal. Instead of performing straight line scans across the screen, therefore, the spot follows an irregular course as indicated by the two representative lines in FIG. 2, the height of the peaks being representative of the brightness of the video information signal at that X position in the scan.

In combination with the X shift of successive line scans this Y displacement of the spot during each scan provides a pseudo three dimensional image displayed on the screen. The mixer 34 is adjustable so that the displacement of the signal in the Y direction in dependence on the video signal can be adjusted. This adjustment is represented by the distance D shown in FIG. 2.

Adjustment of the mixer 33 therefore controls the apparent position of the observer with respect to the pseudo three dimensional display and adjustment of the mixer 34 adjusts the peak height of the display to suit the measurement or recording techniques to be used on the display.

We claim:

1. In an optical diffractometer system of the type comprising:
    a laser as light source,
    holder means for supporting an object, an image transformation unit for providing a Fourier transform of an object carried by said object holder means, and an image reconstruction unit including means for focusing an image transform at a transform plane and a reconstructed image at an image plane, the improvement wherein:

said laser is a multimode device, said image transformation unit includes a condenser lens a first adjustable aperture stop positioned in the focal plane of said condenser lens, such that adjustments to the size of said aperture stop effect adjustments to said image transform quality, a collimator lens from which substantially plane parallel light is directed towards an object carried by said object holder means, and a second adjustable aperture stop located at the entrance pupil of said collimator lens, between said first adjustable aperture stop at the rear focal plane of said condenser lens and said collimator whereby adjustments to the size of said further adjustable aperture stop effect adjustments to one or both of said transform image at said transform plane and said reconstructed image at said image plane, and there is:

a television camera positioned to receive light from said image reconstruction unit, means for modulating the line scan of said television camera by a Y signal repesentative of the television camera beam current, means for modulating the line scan of said television camera to effect an X-shift in dependence on the line position, and means for displaying the signal from the camera, whereby a pseudo three dimensional display of an image from said image reconstruction unit can be obtained.

2. The optical diffractometer of claim 1 wherein said means for displaying said signal from said camera include a cathode ray tube having X and Y deflection producing means and said television camera includes sync pulse generator means, and Y ramp generator means connected to said sync pulse generator means and deriving its signal rate from the sync pulse rate of said sync pulse generator means, and said means for modulating said line scan of said television camera by a Y signal representative of the television camera beam current includes a first mixer connected to said Y ramp generator means and to means producing a signal representative of said television tube beam current, the output of said first mixer being connected to said Y deflection producing means of said cathode ray tube.

3. The optical diffractometer of claim 2 wherein said first mixer is adjustable whereby to adjust the amplitude of said modulation of said line scan by said Y signal representative of said television camera beam current.

4. The optical diffractometer of claim 2, wherein said Y ramp generator is adjustable whereby to adjust the height of said display on said cathode ray tube.

5. The optical diffractometer of claim 1, wherein said means for displaying said signals from said camera include a cathode ray tube having X and Y deflection producing means and said television camera includes sync pulse generator means, X ramp generator means connected to said sync pulse generator means and deriving its signal rate from the sync pulse rate, and Y ramp generator means connected to said sync pulse generator means and deriving its signal rate from the sync pulse rate, and said means for modulating said line scan of said television camera to effect an X-shift in dependence on the line position comprises a second mixer the input of which is connected to said X ramp generator means and said Y ramp generator means and the output of which is connected to said X deflection producing means of said cathode ray tube.

6. The optical diffractometer of claim 5, wherein said X ramp generator is adjustable whereby to adjust the width of said display on said cathode ray tube.

7. The optical diffractometer of claim 5, wherein said Y ramp generator is adjustable whereby to adjust the height of said display on said cathode ray tube.

8. The optical diffractometer of claim 5, wherein said second mixer is adjustable whereby to adjust the degree of X shift of each line scan in dependence on its position.

9. The optical diffractometer of claim 8 wherein said X ramp generator is adjustable whereby to adjust the width of said display on said cathode ray tube.

10. The optical diffractometer of claim 8, wherein said Y ramp generator is adjustable whereby to adjust the height of said display on said cathode ray tube.

11. The optical diffractometer of claim 1, wherein said image reconstruction unit includes means for focusing an image transform at a transform plane and a reconstructed image at an image plane.

12. The optical diffractometer of claim 11, wherein there are further provided means for selectively focusing said camera at said transform plane or said image plane whereby said image transform or said reconstructed image may be selectively displayed by said display means.

13. The optical diffractometer of claim 12, wherein said means for selectively focusing said camera at said tranform plane or said image plane comprises a focusing lens movable into or out of position on the optic axis of said diffractometer.

* * * * *